United States Patent [19]
Holman et al.

[11] Patent Number: 5,345,525
[45] Date of Patent: Sep. 6, 1994

[54] UTILITY OPTICAL FIBER CABLE

[75] Inventors: James R. Holman; Terry D. Mathis, both of Lilburn; Parry A. Moss, Stone Mountain, all of Ga.

[73] Assignee: AT&T Bell Laboratories, Murray Hill, N.J.

[21] Appl. No.: 826,740

[22] Filed: Jan. 28, 1992

[51] Int. Cl.$^5$ .............................................. G02B 6/44
[52] U.S. Cl. .................................. 385/104; 385/106
[58] Field of Search ............... 385/104, 106, 102, 108, 385/113

[56] References Cited
U.S. PATENT DOCUMENTS

| | | | |
|---|---|---|---|
| 4,645,298 | 2/1987 | Gartside, III | 385/106 |
| 4,659,174 | 4/1987 | Ditscheid et al. | 385/113 |
| 4,720,164 | 1/1988 | Oestreich | 385/106 |
| 4,783,953 | 11/1988 | Akre | 385/106 |
| 4,893,893 | 1/1990 | Claxton et al. | 385/108 |
| 4,898,451 | 2/1990 | Story | 385/106 |
| 4,913,517 | 4/1990 | Arroyo et al. | 350/96.23 |
| 5,010,210 | 4/1991 | Sidi et al. | 174/34 |
| 5,016,973 | 5/1991 | Hager et al. | 385/102 |
| 5,024,506 | 6/1991 | Hardin et al. | 385/102 |

FOREIGN PATENT DOCUMENTS 2096343 10/1982 United Kingdom .

OTHER PUBLICATIONS

Sumitomo Electric Technical Review, No. 26, Jan. 1987, pp. 63–69, Nobumasa Nirasawa, et al., "A Newly Developed Water–Blocking Fiber Optic Cable".

*Primary Examiner*—Frank Gonzalez
*Attorney, Agent, or Firm*—D. E. Hayes, Jr.; E. W. Somers

[57] ABSTRACT

An optical fiber cable (20) includes a core (22) which includes a plurality of bundles (31, 31) of optical fiber (24) and a yarn-like strength member system (35) which is wrapped with an oscillated or unidirectional lay about the optical fibers. The strength member system also provides impact resistance for the fibers. A jacket (40) which may include a flame-resistant plastic material encloses the core with the outer diameter of the jacket being substantially less than that of typical optical fiber cables. Portions of the strength member system contact an inner surface of the jacket, an outer surface of which is the outer surface of the cable.

16 Claims, 1 Drawing Sheet

UTILITY OPTICAL FIBER CABLE

TECHNICAL FIELD

This invention relates to a utility optical fiber cable. More particularly, this invention relates to an optical fiber cable which may be used for temporary installations such as, for example, in restoring service across communication line damage locations.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons to provide a core. In one manufacturer's line of cables, the core is enclosed by a plastic tube and a plastic jacket.

Many different design optical fiber cables are available commercially. There are cables which include metallic shields, non-metallic or metallic longitudinally extending strength members and those which include grease-like filling material or superabsorbent polymer waterblocking materials. A typical optical fiber cable which is used between central offices has an outer diameter which is on the order of about 0.5 inch.

Although the commercially available optical fiber cables fulfill specific needs, there is a demand for a simplistic optical fiber cable which may be used as a utility cable and which need not include some of the provisions included in the cables discussed hereinabove. For example, there is a need for a cable which may be used to restore service around a damage location in a communication line.

During the service life of an optical fiber cable, the cable may become damaged. This may occur, for example, through unintentional contact by various kinds of excavation equipment, by lightning or by repeated attack by animals such as gophers, for example. Such damage may be partial in which case one or several optical fibers may be interrupted, or the damage may be total, such as a complete cable cut, for example.

In any case, it becomes necessary to restore service as quickly as possible. This may be done through an expedited temporary arrangement while more work is under way to replace the damaged cable. Typically, the replacement is an equivalent or a cable having enhanced features.

A temporary arrangement must be one which is easily installed and which is low in cost. Elements of the arrangement which must include a cable must be capable of being packaged in a carrying case which is portable and, desirably, in one which may be carried by an individual from a vehicle to a field location at which a disruption to service has occurred.

The sought after cable of the temporary arrangement for restoring service which has been interrupted because of damage to an existing cable should be one which is simplistic in design yet is one which is capable of providing service at least on a temporary basis. It should be light in weight so as to render it portable and capable of being carried easily to damage locations. Also, inasmuch as it may be used on a temporary basis and may be discarded after such use, it should be one which is relatively low in cost. It should be flexible so that it may be installed easily without the need for mechanized installation equipment. And of course, because it includes optical fibers, it must be one which includes strength members so that the optical fibers are not overstressed.

Accordingly, what is sought after and what seemingly is not available in the art is a lightweight, small, low-cost optical fiber cable which has sufficient strength to allow it to be installed without damage to the optical fiber therein. The sought after cable should be very flexible and smaller in outer diameter and lighter in weight than typical optical fiber cables.

SUMMARY OF THE INVENTION

The foregoing problems of the prior art have been overcome with cables of this invention. A cable of this invention includes a core which includes optical fiber transmission media and a jacket comprising a plastic material and having an outer surface which is the outer surface of the cable. A strength member system comprising yarn-like material having a lay is disposed between the optical fiber transmission media and the jacket with a portion of the strength member system engaging an inner surface of the jacket.

In a preferred embodiment, the core includes three bundles of optical fibers, each bundle including twelve optical fibers. The three bundles are stranded together and provided with a unidirectional or oscillating lay. The jacket of the preferred embodiment is a polyvinyl chloride plastic material. The outer diameter of the cable of the preferred embodiment is about 0.185 inch.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
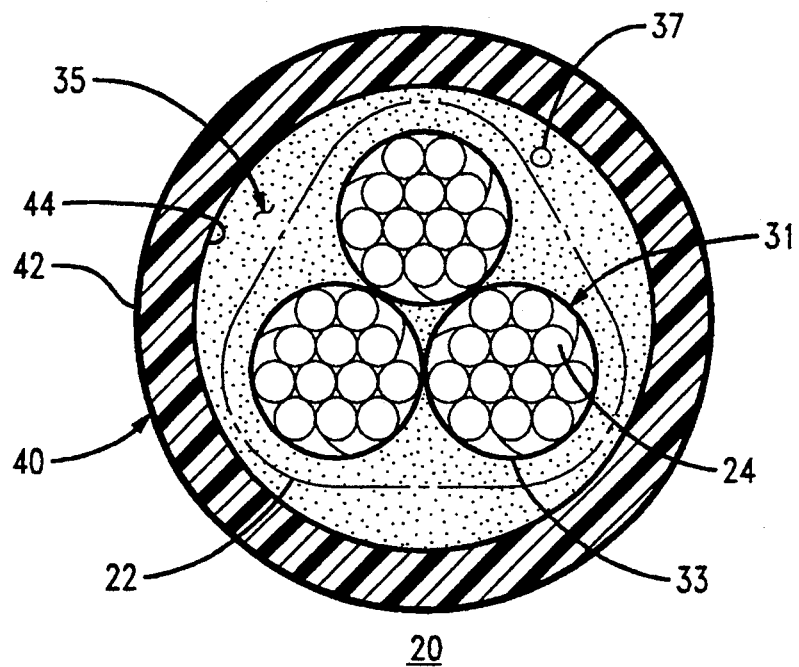
FIG. 1 is an end view of a cable of this invention which shows a core comprising three bundles of optical fibers.

Referring now to FIG. 1, there is shown an optical fiber cable of this invention which is designated generally by the numeral 20. The cable 20 includes a core 22 which comprises optical fiber transmission media 24-24 and which is shown generally by the broken line in FIG. 1. Each optical fiber transmission medium includes an optical fiber which is enclosed in one or more layers of coating material. For a description of a coating system for an optical fiber, see U.S. Pat. No. 4,962,992 which issued on Oct. 16, 1990, in the names of J. T. Chapin, A. G. Hardee, Jr., L. M. Larsen-Moss, C. M. Leshe, B. J. Overton, J. W. Shea, C. R. Taylor, and J. M. Turnipseed.

Typically, the cable 20 includes a plurality of bundles of optical fiber 24, each bundle being designated by the numeral 31. Also, typically, each bundle 31 includes a plurality of optical fibers 24-24 which are held together by two colored, thread-like binders 33-33 which are wrapped in opposite helical directions about the fibers. Binders typically are made of a plastic material and are well known in the art. The fibers extend longitudinally along the core without any intended stranding. The bundles are stranded together with a unidirectional twist lay or with what is referred to as an oscillated or S–Z lay in which the direction of the lay is reversed periodically. In order to provide an oscillated lay, the bundles 31-31 are fed through an oscillating face plate (not shown). The lay length of the assembled bundles 31-31 is in the range of about eight to fourteen inches. In a preferred embodiment, the cable 20 includes three bundles 31-31, each including twelve fibers.

As can be seen in FIG. 1, the bundles 31-31 of optical fibers generally are in engagement with each other. Also, preferably, the bundles 31-31 are centered within the core 22.

Figure 2:
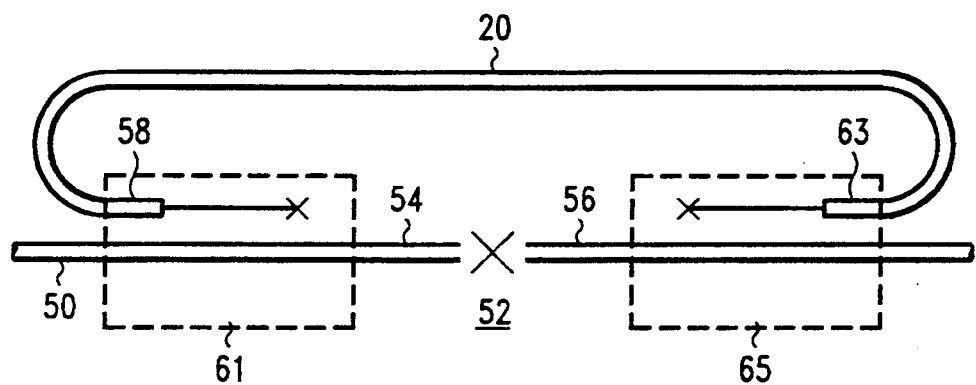
FIG. 2 is a plan view in schematic of the cable of FIG. 1 being used to bridge a cable about a damage location.

As can be seen in FIGS. 1 and 2, the core 22 also includes a strength system which is designated generally by the numeral 35. The strength system 35 includes a plurality of longitudinally extending yarn-like members 37-37. In a preferred embodiment, the strength system includes 8×1420 denier aramid yarns such as Kevlar ® yarn.

The yarn-like strength members are wrapped helically or wrapped with an oscillated lay about the bundles 31-31 of optical fibers 24-24. The lay length of the strength members 37-37 is about six to eight inches. If the strength members 37-37 are not provided with a helical wrap or an oscillated lay, the strength members most probably would kink when the cable is bent. The kinked strength members could impact the optical fibers which could lead to undesirable microbending. A preferred lay is about six inches and is unidirectional.

About the core is disposed a jacket 40. The jacket 40 is made of a plastic material which in a preferred embodiment, is a flame-retardant plastic material such as a polyvinyl chloride (PVC) plastic material. The plastic material of the jacket 40 also may be a non-halogenated plastic material, for example. In a preferred embodiment, the outer diameter of the jacket 40 is about 0.185±0.005 inch whereas its inner diameter is about 0.115±0.005 inch.

It should be observed that an outer surface 42 of the jacket 40 is an outer surface of the cable 20. Also, it should be observed that portions of the strength member system 35 contact an inner surface 44 of the jacket 40.

Advantageously, the yarn-like strength members 37-37 which are disposed in the core 22 and which encase the optical fiber bundles perform another important function. The yarn-like strength members 37-37 provide protection of the optical fibers as the jacket 40 is being slit to provide access to the core. Also, not only does the yarn-like system provide tensile strength for the cable 20, it also provides impact resistance. As such, it cushions the optical fibers 24-24 in the core 22 from impact, thereby preventing damage to the optical fibers.

As is apparent from the drawings, there is no core wrap interposed between the core 22 and the plastic jacket 40. Advantageously, the yarn-like strength members 37-37 prevent hot extruded plastic material which is to form the jacket 40 from sticking to the optical fibers 24-24. As a result, the outer jacket 40 may be easily stripped from the underlying yarn-like strength members 37-37 and the optical fiber transmission media.

In the manufacture of the cable 20, the jacket 40 is tubed rather than pressure extruded onto the core 22. During such an operation, the jacket plastic is applied about the traveling assembly of optical fiber bundles 31-31 and yarn-like strength members 37-37 so as to have an outer diameter which is larger than its desired size and then drawn down to form a loose fitting tubular member about the assembly of optical fiber bundles and yarn-like strength members. As a result, the tight fit of a pressure extruded jacket is avoided, permitting relatively easy removal of portions of the jacket 40 in the field. Such a structure results in a cable having enhanced flexibility and decreased sensitivity to microbending.

Removal of the jacket 40 is facilitated further because of the absence of any strength members in the jacket. The tubed jacket is easily slit and removed to expose the yarn-like strength members 37-37 and the optical fiber bundles 31-31.

Because of its structure, the cable 20 is very light in weight which allows substantial footage to be carried by a craftsperson in the field. Also, because of the material of the jacket and its thickness, the cable is very flexible and hence relatively easy to unwind and to rewind.

Further, because the yarn-like strength members 37-37 are applied to the optical fiber bundles 31-31 using a relatively long lay length of about six to eight inches, it becomes relatively easy to separate the yarn-like strength members from the optical fiber bundles. Also, the use of an oscillated lay of the fiber bundles 31-31 appears to allow redistribution of stresses in the fibers during handling and installation, thereby reducing added loss due to packaging.

There is a significantly higher packing ratio in cable cores of this invention than in the cable cores of many other optical fiber cables. By packing ratio is meant the ratio of the sum of transverse cross sectional areas of the optical fibers 24-24 in the core 22 to the transverse cross sectional area defined by an inner diameter of the jacket 40. That ratio is in the range of about 0.42. Although the yarn-like strength members are wrapped about the fiber bundles and the jacket plastic tubed about and drawn down on the core, there is little effect of the relatively high packing ratio on the performance of the cable 20 because the cable typically is in restoration use only a day or two until a permanent cable installation can be made and because the cable is of relatively short length.

The cable 20 has several significant advantages. The cable is very flexible and provides a relatively large number of optical fibers in a relatively small core. The optical fibers 24-24 are unbuffered and the core is free of grease-like waterblocking material. The core is very easy to access, thus resulting in reduced times required for splicing and connecting. Because the cable is free of grease-like waterblocking material, because the optical fibers are not buffered and because the core is easy to access, the cable 20 is easy to install and connect to portions of the cable on each side of the damage location. As a result, service may be restored rapidly.

A typical use of the cable 20 in restoring service to a customer or customers served by a cable 50 is depicted in FIG. 2. In the situation depicted in FIG. 2, the damage to the cable 50 is a complete break at a location 52 with end portions 54 and 56 of the cable newly formed by the break. The cable 20 may be included in a restoration kit such as that described and claimed in commonly assigned, copending application Ser. No. 07/826,703 filed on even date herewith in the name of J. A. Aberson, Jr., E. Halupke, and W. C. Vicory, now U.S. Pat. No. 5,185,843 issued Feb. 9, 1993 and which is incorporated by reference hereinto. One end 58 of the cable 20 is connected to the end portion 54 of the cable 50 in a closure 61 which also is included in the restoration kit. The closure 61 may be one described and claimed in commonly assigned, copending application Ser. No. 07/826,711 filed on even date herewith in the names of W. Bensel and G. C. Cobb, now U.S. Pat. No. 5,189,725, issued on Feb. 23, 1993 and which is incorporated by reference hereinto. The cable 20 is unwound from the kit and an end portion 63 pulled to a location on an opposite side of the damage location and connected to the end portion 56 of the cable 50 in another closure 65.

Although the cable 20 is ideally suited for use in providing temporary service around line breaks in outside plant, it has other uses. For example, it could be used as a riser cable. Typically a standard riser cable includes twelve fibers and has an outer diameter of about 0.225 to 0.275 inch. In contrast, cable of this invention with an outer diameter of about 0.185 inch includes three bundles of twelve fibers each. Thus duct utilization may be maximized and in a vertical pull over several stories, less weight is involved.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which comprises:
   a core comprising a plurality of longitudinally extending bundles of optical fiber, each bundle comprising a plurality of optical fibers which are held together by a binder system which is associated with and wrapped about each plurality of optical fibers;
   a jacket which encloses said core, which is comprised of a plastic material and which has an outer peripheral surface which is the outer surface of said cable; and
   a strength member system comprising yarn-like material having a lay and being disposed between optical fibers and an inner surface of said jacket with a portion of said strength member system engaging an inner surface of said jacket.

2. The optical fiber cable of claim 1, wherein said binder system of each bundle comprises two binders which are wrapped in opposite helical directions about said each bundle.

3. The optical fiber cable of claim 1, wherein said bundles of optical fibers are stranded together with an oscillated lay.

4. The optical fiber cable of claim 1, wherein said bundles of optical fibers are stranded together with a unidirectional lay.

5. The optical fiber cable of claim 1, wherein the plastic material of said jacket is a flame retardant plastic material.

6. The optical fiber cable of claim 5, wherein the plastic material of said jacket is a polyvinyl chloride plastic material.

7. The optical fiber cable of claim 5, wherein the plastic material is a non-halogenated plastic material.

8. The optical fiber cable of claim 1, wherein said jacket comprises a plastic material which has been tubed over said core.

9. The optical fiber cable of claim 8, wherein tubing of said jacket is accomplished to cause the jacket to be disposed loosely about said core.

10. The optical fiber cable of claim 1, wherein the lay of the yarn-like material of said strength member system is an oscillated lay.

11. The optical fiber cable of claim 1, wherein the lay of the yarn-like material of said strength member system is a unidirectional lay.

12. The optical fiber cable of claim 1, wherein an outer diameter of said cable does not exceed about 0.2 inch.

13. The optical fiber cable of claim 1, wherein the ratio of the sum of the transverse cross sectional areas of the optical fiber in said core to the transverse cross sectional area defined by an inner diameter of said jacket is relatively high.

14. The optical fiber cable of claim 13, wherein said ratio is about 0.42.

15. The optical fiber cable of claim 1, wherein the lay of said strength member system is sufficiently long to facilitate access to said optical fibers.

16. The optical fiber cable of claim 1, wherein the yarn-like material comprises an aramid material.

* * * * *